(12) United States Patent
Mueller et al.

(10) Patent No.: US 12,318,771 B2
(45) Date of Patent: Jun. 3, 2025

(54) SYSTEM FOR PROCESSING LIQUID AND/OR SOLID COMPOUNDS

(71) Applicant: HTE GMBH THE HIGH THROUGHPUT EXPERIMENTATION COMPANY, Heidelberg (DE)

(72) Inventors: Andreas Mueller, Heidelberg (DE); Cornelia Kermer, Ludwigshafen (DE); Juergen Siroky, Ludwigshafen (DE); Philipp Coelsch, Ludwigshafen (DE); Rudi Delgas, Ludwigshafen (DE); Andreas Schleich, Heidelberg (DE); Martin Staehler, Heidelberg (DE); Christoph Schemainda, Heidelberg (DE); Ralf Schmied, Heidelberg (DE); Sebastian Keim, Heidelberg (DE)

(73) Assignee: HTE GMBH THE HIGH THROUGHPUT EXPERIMENTATION COMPANY, Heidelberg (DE)

( * ) Notice: Subject to any disclaimer, the term of this patent is extended or adjusted under 35 U.S.C. 154(b) by 840 days.

(21) Appl. No.: 17/595,005

(22) PCT Filed: Apr. 30, 2020

(86) PCT No.: PCT/EP2020/062090
§ 371 (c)(1),
(2) Date: Nov. 5, 2021

(87) PCT Pub. No.: WO2020/225110
PCT Pub. Date: Nov. 12, 2020

(65) Prior Publication Data
US 2022/0193628 A1  Jun. 23, 2022

(30) Foreign Application Priority Data
May 6, 2019  (EP) .................................... 19172767

(51) Int. Cl.
*B01J 8/10* (2006.01)
*B01J 8/00* (2006.01)

(52) U.S. Cl.
CPC ................. *B01J 8/10* (2013.01); *B01J 8/002* (2013.01); *B01J 2219/0034* (2013.01); *B01J 2219/00691* (2013.01)

(58) Field of Classification Search
CPC ...... B01J 8/10; B01J 8/002; B01J 2219/0034; B01J 2219/00691; B01J 2219/00283
See application file for complete search history.

(56) References Cited

U.S. PATENT DOCUMENTS 4,944,924 A * 7/1990 Mawhirt ................... B01L 9/06
422/65
6,139,802 A 10/2000 Niermann et al.
(Continued)

FOREIGN PATENT DOCUMENTS

DE   102007030790 A1   1/2009
EP       0916397 A2    5/1999

OTHER PUBLICATIONS

International Search Report and Written Opinion for PCT/EP2020/062090 mailed Sep. 21, 2020, 15 pages.

*Primary Examiner* — Marc C Howell
*Assistant Examiner* — Patrick M McCarty
(74) *Attorney, Agent, or Firm* — Element IP, PLC

(57) ABSTRACT

The invention relates to a system for processing liquid and/or solid compounds, comprising a vessel (3) and a holding device (5) for the vessel (3), the holding device (5) comprising a stop (15) against which the vessel (3) rests after being inserted into the holding device (5) and a supply unit (7) opposite the stop (15), the supply unit (7) comprising a closing element (9), which can be set to a first and a second position, wherein in the first position of the closing element (9) the vessel (3) can be inserted into the holding (Continued)

device (5) and in the second position of the closing element (9) the vessel (3) inserted into the holding device (5) is pressed against the stop (15) by the closing element (9).

14 Claims, 3 Drawing Sheets

(56) References Cited

U.S. PATENT DOCUMENTS

| | | | | |
|---|---|---|---|---|
| 6,916,114 | B2* | 7/2005 | Verkerk | B01F 35/93 |
| | | | | 366/147 |
| 9,927,333 | B2* | 3/2018 | Sandra | G01N 1/34 |
| 10,830,784 | B2* | 11/2020 | Whitacre | B01F 25/4331 |
| 2005/0072793 | A1* | 4/2005 | Mehus | B01F 35/2117 |
| | | | | 222/77 |
| 2005/0178190 | A1* | 8/2005 | Wollenberg | G01N 33/2888 |
| | | | | 73/53.01 |
| 2005/0232074 | A1 | 10/2005 | Higashihara et al. | |
| 2006/0246593 | A1* | 11/2006 | Towler | B01J 19/0046 |
| | | | | 436/73 |
| 2008/0213872 | A1* | 9/2008 | Regan | G01N 35/08 |
| | | | | 422/255 |
| 2010/0149908 | A1* | 6/2010 | Singh | B01F 31/445 |
| | | | | 366/276 |
| 2013/0064738 | A1* | 3/2013 | Berger | G05D 7/0635 |
| | | | | 436/180 |
| 2015/0218499 | A1* | 8/2015 | Frye | C12C 11/006 |
| | | | | 99/276 |

* cited by examiner

SYSTEM FOR PROCESSING LIQUID AND/OR SOLID COMPOUNDS

CROSS-REFERENCE TO RELATED APPLICATIONS

The present application is a national phase entry under 35 U.S.C. § 371 of International Application No. PCT/EP2020/062090, filed on Apr. 30, 2020, which claims priority to European Patent Application No. 19172767.6 filed on May 6, 2019. The contents of these applications are hereby incorporated by reference herein in their entirety.

The invention relates to a system for processing liquid and/or solid compounds, comprising a vessel, a mixing device and a holding device for the vessel. Processing of the compounds for example comprises a chemical reaction or mixing of at least two different compounds.

For developing new processing methods or for improving present processing methods, usually experiments are carried out in a laboratory and—particularly for processes which are intended to be carried out in industrial scale—in pilot plants which have a smaller size than the intended industrial scale.

During the developing process, it may be necessary to carry out a number of experiments with varying parameters. Such parameters for example may be temperature, pressure, amount of components or catalyst.

Particularly for processes using biological material usual laboratory scale does not represent problems which may occur in industrial scale, particularly fouling on surfaces of apparatus used in the process. Such processes using biological material for example are processes which use enzymes or bacteria as catalyst or for modifying or converting a raw material. Further such processes also may comprise such for producing biopolymers or products which can be produced by bacterial or algae growth.

One main disadvantage of such processes using biological material is an increasing tendency of fouling particularly in stirred tanks which finally will significantly influence the process. Therefore, in present pilot plants or laboratory equipment for carrying out processes which tend to fouling of the apparatus much time is needed for cleaning between the experiments.

Therefore, it is an object of the present invention to provide a system which can be used for processing liquid and/or solid compounds in a pilot plant or laboratory for carrying out a number of experiments without wasting a lot of time for cleaning the equipment.

This object is achieved by a system for processing liquid and/or solid compounds, comprising a vessel and a holding device for the vessel, the holding device comprising a stop against which the vessel rests after being inserted into the holding device and a supply unit opposite the stop, the supply unit comprising a closing element, which can be set to a first and a second position, wherein in the first position of the closing element the vessel can be inserted into the holding device and in the second position of the closing element the vessel inserted into the holding device is pressed against the stop by the closing element, wherein the closing element comprises a ball which is mounted rotatable in a housing, the ball comprising an opening through which the vessel can be inserted into the holding device in the first position and wherein the vessel rests on an outer surface of the ball in the second position.

By using a system comprising a vessel and a holding device, it is possible to easily change the vessels and to use a new vessel for any new process. This allows to start a new process immediately after finishing the previous process by removing the vessel in which the previous processing was carried out from the holding device and to insert a new vessel for the next process in the holding device.

A "vessel" in regard to the present application can be any suitable vessel in which the intended process can be carried out. The size of the vessel thereby is such that the vessel can be introduced into the holding device. The vessel may have any suitable cross sectional area, for example circular or with an angular shape having at least 3 angles, particularly 3 to 12 angles, for example 3 to 8 angles, like triangular, rectangular, particularly quadratic, pentagonal, hexagonal or octagonal. However, particularly preferred is a circular cross sectional area. The vessel may have a replaceable cover or no cover. If the vessel has no cover, it for example can be closed by a respective cover which is part of the holding device.

The used vessel then can be cleaned independently from operating the system. Alternatively, particularly for processes which lead to deposits on the vessel which cannot be removed or which only can be removed partly or with great effort, it is also possible to dispose the used vessels.

Another advantage of the inventive system is that it allows at least a partial automation of the process. This for example allows to prepare the vessels for different processing steps, for example reactions with different reaction parameters or different catalysts and to automatically exchange the vessels after one process is finished. The vessels for example can be prepared and then stored in a suitable store to remove and insert them into the holding device in succession by using a suitable feeder, particularly an automatic feeder. To insert the vessels in the desired order, it is for example possible to use a conveyor onto which the vessels are placed and from which the vessels are inserted into the holding device. Alternatively, it is also possible to use a storage rack into which the vessels are placed and a feeder arm which can grab the next vessel. For this embodiment, it is preferred to use a programmable feeder arm.

The holding device preferably is designed in such a way that the stop is on the upper side and the closing element through which the vessel can be inserted into the holding device is on the bottom side. This means that the vessel is inserted from the bottom upwards into the holding device. To prevent the vessel falling out of the holding device after being inserted and before the closing element has closed, the vessel is fixed in the holding device after being inserted. This also is necessary to allow the feeder to be removed from the vessel after the vessel is inserted into the holding device because generally the closing element only can be closed after the feeder is removed.

For fixing the vessel any suitable locking device can be used. Suitable locking devices for example comprise a pin which is pressed against the vessel or into a recess in the vessel by a spring. Further, it is also possible to slightly close the closing element to fix the vessel in the holding device. In this regard, the closing element only closes to such an extent that the feeder still can be removed from the vessel and the holding device. After the feeder is removed, the closing element closes and thus presses the vessel against the stop.

The closing element can be any closing element which allows fixing of the vessel in the holding device. Particularly preferably, the holding device and the closing element are designed such that inside the holding device a space is formed into which the vessel can be inserted and which can be tightly closed by the closing element. This allows for example to evacuate the space and thus the vessel or to set a pressure above ambient pressure to the space and thus the vessel. The pressure which is set to the space in the holding device and the vessel thereby depends on the process which shall be carried out.

Closing elements for example may be a slider or a piston by which the space in the holding device can be closed and by which the vessel is hold in the space. If the closing element is on the bottom side of the holding device, the vessel stands on the slider or piston after being inserted into the holding device.

According to the invention, however, the closing element comprises a ball which is mounted rotatable in a housing, the ball comprising an opening through which the vessel can be inserted into the holding device in the first position and wherein the vessel rests on an outer surface of the ball in the second position. The cross sectional area of the opening thereby particularly corresponds to the cross sectional area of the vessel to be inserted into the holding device. The convex surface of the ball has the additional advantage that the vessel is further lifted inside the holding device by the ball when the ball is rotated to fix the vessel. This additional lifting of the ball results from the fact that the surface of the ball contacts the vessel firstly with the edge of the opening at the edge of the vessel and then, when the closing elements rotates further, the edge of the opening moves to the center of the ball. Due to the convex surface, the edge rotates around a rotation axis of the ball, preferably the central axis of the ball, having a constant distance which corresponds to the radius of the ball. At the beginning of the rotation, the distance from the rotation axis to the edge of the bottom of the vessel corresponds to the radius of the ball and as soon as the edge of the opening in the ball has reached the center of the bottom of the ball, the distance from the rotation axis to the center of the ball corresponds to the radius of the ball. By the lifting resulting from the rotation of the ball, the vessel is pressed against the stop in the holding device.

Depending on the process which is carried out in the vessel, it may be necessary to mix the components. For mixing, any suitable mixing device can be used. Mixing devices for example are stirrers or internals for generating a turbulent flow in the vessel. Such an internal for example may be a nozzle through which a liquid is introduced into the vessel. However, preferably the mixing device is a stirrer, whereby the stirrer may have any design known to a skilled person. Thus, the stirrer for example can be a blade or paddle stirrer, a propeller stirrer or an anchor stirrer. If the stirrer is a blade or paddle stirrer, the stirrer may have two or more blades or paddles, for example 2 to 8 blades or paddles, wherein the blades or paddles may be oriented perpendicular to the moving direction of the stirrer or at an angle between 0 and 90°, usually between 30 and 60° to the moving direction. The moving direction thereby is the circumferential direction in regard to the rotational axis of the stirrer.

If the system comprises a mixing device, the mixing device either can be mounted in the vessel, wherein in this embodiment the holding device comprises a seating for the mixing device which is arranged such that the mixing device is inserted into the seating when the vessel rests against the stop, or the mixing device can be arranged on the holding device in such a way that the mixing device enters into the vessel when the vessel is inserted into the holding device.

The embodiment with the mixing device being mounted in the vessel and the seating for the mixing device in the holding device particularly is preferred, when a process is carried out in the vessel where the mixing device may stick in the vessel, for example processes for analyzing adhesives or polymers. In these cases after completing the process, the vessel is removed with the stirrer from the holding device. If the stirrer cannot be removed from the contents of the vessel, preferably a one-way stirrer is used which can be deposited. For contents where it is possible to remove the stirrer even after some effort, it is also possible to use reusable stirrers after they were removed from the contents of the vessel.

If the mixing device is mounted in the vessel, preferably a support for the mixing device is used which is placed on top of the cap. If the mixing device is a stirrer, the support for example may comprise a sleeve through which encloses the axis of the stirrer. To avoid the stirrer falling from the support, for example a protrusion on the axis can be used which rests on the upper face of the sleeve. Further it is also possible to mount the stirrer in the support by any other joint known to a skilled person by which slipping through the support is avoided. To further avoid the stirrer to strike against the vessel, it is particularly preferred, that the stirrer is centrally arranged in the vessel.

Like the stirrer, it is also possible to use one-way vessels or reusable vessels depending on the process which is carried out. For processes where it is not possible to completely remove the contents from the vessel, one-way vessels are used. As long as it is possible to completely remove the contents from the vessel so that the vessel can be reused without producing incorrect results due to contamination for remainders in the vessel which could not be removed, it is preferred to use reusable vessels.

The vessel and the stirrer can be made of any suitable material which does not affect the process which is carried out in the vessel. Suitable materials for example are metals, plastics, ceramic, porcelain or glass. Metals which can be used for the vessel for example are aluminum, steel, stainless steel or nickel-base alloys. If the material for the vessel is a plastic, preferably polytetrafluorethylene (PTFE), polypropylene (PP) or Polyethylene terephthalate (PET) are used. Suitable materials for the stirrer are the same as for the vessel. Thereby, the material for the vessel and the material for the stirrer can be the same or different materials are used for the stirrer and the vessel, for example a metal is used for the vessel and a plastic for the stirrer. Besides producing the vessel from one material it is also possible to provide the inner surfaces of the vessel with a coating. This allows to use an ordinary material for producing the body of the vessel and another material for the coating, for example steel or aluminum for the body and stainless steel or a nickel-base alloy for the coating or a metal like steel or aluminum for the body and a plastic for the coating. To reduce the weight of the vessel, it is also possible to use a plastic for the body and a metal for the coating. If the vessel is equipped with a coating, the material for the coating is selected such that it does not affect the process which is carried out in the vessel. Suitable materials for the coating, therefore, preferably are the same as for the vessel if the vessel is produced from only one material without a coating.

To avoid some of the content of the vessel to sprout out of the vessel into the surroundings or to avoid material from the surrounding coming into contact with the contents of the vessel, for example air, it is preferred to provide a cover to close the vessel. The cover can be either part of the vessel or in the alternative part of the holding device. If the cover is part of the holding device, it is particularly preferred if the stop in the holding device is part of the cover by which the vessel is closed, when inserted into the holding device. The cover further allows to carry out processes in an inert atmosphere by feeding an inert gas, for example nitrogen, carbon dioxide or a noble gas like argon into the vessel.

Further, to avoid that some of the content spurts out of the vessel, the stop preferably comprises a sealing element against which the vessel rests when being inserted into the holding device. The sealing device can be any sealing known to a skilled person. Preferably a sealing ring is placed into a groove in the holding device. Alternatively, it is also possible to provide the vessel with a sealing ring which is pressed against the stop when the vessel is introduced into the holding device. Particularly for the embodiment where the vessel is introduced into the holding device from the bottom, it is preferred to provide the vessel with a sealing ring to avoid the sealing ring falling out of the holding device when there is no vessel inserted. On the other hand, it is also possible to adhere the sealing ring to the holding device to avoid that the sealing ring falls out of the holding device. For adhering the sealing ring to the holding device it is for example possible to clamp the sealing ring to the holding device or to use an adhesive. Independently of being connected to the vessel or the holding device, the sealing ring can be for example an O-ring, a flat seal or a seal tape.

Providing the cover and the sealing ring further allows to set a vacuum or an excess pressure to the vessel which allows to carry out such processes which are operated at pressures different to ambient pressure. For setting a vacuum or providing an excess pressure, the cover preferably comprises a connecting unit to which a vacuum pump or a compressor can be connected. In case of a process to be carried out in the vessel with an inert atmosphere, the compressor also can be used to feed the inert gas into the vessel. If the process in this case shall be carried out at ambient atmosphere, additionally an exhaust line must be provided to allow gas flowing out of the vessel to keep a constant pressure when an inert gas is fed into the vessel.

Further, it is preferred, that the holding device comprises a temperature regulating element for tempering the vessel. Depending on the process to be carried out in the system, the temperature regulating element can be a heating element, a cooling element or a device which allows heating and cooling. Such a temperature regulating element for example can be a heating or cooling coil, a double jacket or an electrical heating element or induction heating. If a heating or cooling coil or a double jacket is used, for tempering the contents of the vessel, preferably a tempering medium is used which flows through the heating or cooling coils or through the double jacket. The tempering medium for example can be water, oil, steam or a cooling liquid. If the temperature regulating element only is used for heating, it is particularly preferred to use an electrical heating element or induction heating. Besides using cooling coils or a double jacket through which a cooling liquid flows, it is also possible to use Peltier elements for cooling.

Particularly for processes with heating or cooling or to avoid that an exchange with the environment takes place, either by some of the content of the vessel leaking out to the environment or for example by air entering the vessel, it is preferred that the holding device encloses the vessel completely when the closing element is in the second position. Designing the holding device in such a way that it encloses the vessel completely when the closing element is in the second position also is advantageous for processes where the vessel shall be tempered. In this case it is possible to provide for example an insulation in the holding device which also encloses the vessel and by which a heat exchange with the environment can be minimized.

For controlling the process in the vessel and for analyzing the process, it is preferred to provide sensors in the holding device by which process parameters can be measured. Such process parameters for example are pressure, temperature and fill level. The sensors used for measuring pressure, temperature or fill level, thereby, can be any suitable sensors like pressure sensors, temperature sensors or level sensors known to a skilled person. The data measured by the sensors can be transmitted to an analyzer, for example a computer. Transmitting the data can be performed either wireless or by using suitable wiring. Alternatively or additionally it is possible to provide the sensor with a suitable processing unit to analyze the data or with a monitor which shows the data. The sensors can be placed at any position in the holding device depending on the data to be measured. To obtain measured values directly of the content in the vessel, it is further possible to use a support with which the sensors are hold in the content of the vessel. In this case, the support with the sensor preferably is mounted at a position on the holding device which is above the vessel, for example on a cover by which the vessel is closed when inserted into the holding device. Sensors could also be integrated in the vessel itself for example in the vessel walls. In this case also an energy source and a data storage medium can be integrated. The measured data could be stored on a storage medium in the vessel and later sent to the analyzer.

The components which shall be processed in the vessel either can be filled into the vessel before inserting the vessel into the holding device or after the vessel is inserted into the holding device. To fill components into the vessel after being inserted into the holding device, the holding device preferably comprises at least one inlet to feed material into the vessel. Such an inlet to feed material into the vessel for example comprises a tube or a pipe which ends at a position which is above the vessel after being inserted into the holding device. If the vessel is closed by a cover, preferably, a connection is provided on the cover to which the tube or pipe can be connected. If the cover is part of the holding device, the tube or pipe can be connected fixedly to the cover. Besides using a tube or a pipe, it is also possible to use for example a syringe or a pipette which can be connected to the holding device for feeding material into the vessel. In this case a connection is preferred which is unlockable to allow to exchange the syringe or the pipette after being emptied by a new filled syringe or pipette. In an automated process, it is preferred to use a tube or pipe for feeding material into the vessel. If it is not possible to use a tube or a pipe, for example in cases when only very small amounts of a component shall be added or it should be avoided that material rest in the tube or pipe for a too long time, it is preferred to use a suitable feeder, for example a programmable robot arm to change the syringe or pipette.

If the system is used for testing or analyzing purposes, it is further preferred if the holding device comprises at least one entry through which a sample can be taken. Such an entry for example can be a hole with a cover which can be removed to insert an injection needle to draw a sample from the vessel. Besides a cover which is removable, it is also possible to close the entry by a membrane through which the injection needle can be penetrated to draw a sample from the vessel. The membrane preferably is made of an elastic material so that the entry point of the injection needle closes after the injection needle is removed.

For use of the system in an automated process it is further preferred that the system additionally comprises a feeder by which a number of vessels can be inserted into the holding device in succession. Such a feeder for example can be a conveyor belt on which the vessels are transported and which is designed in such a way that the vessel is lifted when a position below the holding device is reached to lift the vessel through the closing element into the holding device. For lifting the vessel for example a piston can be used. Alternatively, it is also possible to use a feeder arm, for example a robot arm to insert the vessel through the closing element into the holding device.

If such an automated feeding of vessels into the holding device is provided, it further is important that a vessel which is in the holding device is removed before a new vessel is inserted. Removing of a vessel thereby can be carried out in the same way as inserting a new vessel into the holding device. For example it is possible to open the closing element to such an extent that the vessel still is hold on place in the holding device and the piston can be brought into a position below the vessel that the vessel stands on the piston. After the vessel stands on the piston, the closing device opens fully and the piston moves downwards with the vessel standing on it. Then the vessel can be transported on a conveyor belt to a following position, for example an analyzer. If not a piston is used but a feeder arm, after opening the closing element to a position at which the vessel still is held in position and the feeder arm can catch the vessel, the vessel is caught by the feeder arm, then the closing element opens fully and the vessel can be removed by the feeder arm.

As it cannot be excluded that material spurts out of the vessel, it is preferred to provide a cleaning unit for cleaning the holding device. Such a cleaning unit for example can comprise an injection lance for spraying a cleaning liquid into the holding device. In this case with an open closing element, the cleaning liquid flows out of the holding device through the opening in the closing device. To avoid cleaning liquid flowing into the environment, during cleaning by spraying a cleaning liquid into the holding device, a collecting vessel is placed below the closing element to collect the cleaning liquid flowing out of the holding device through the opening in the closing element.

Alternatively and preferably, a vessel is used for cleaning the holding device. In this regard, at least one vessel comprises a cleaning device for cleaning the holding device. The cleaning device in this case also can be an injection lance to spray a cleaning liquid into the holding device. The injection lance then is part of the vessel and a supply line for the cleaning liquid is connected to the injection lance in the vessel. The advantage of using a vessel for cleaning is that the used cleaning liquid can flow into the vessel and can be collected by the vessel. For an amount of cleaning liquid which is larger than the filling capacity of the vessel, it is further possible to provide the vessel with a drainage line to drain the used cleaning liquid.

Independently of being used without a vessel or as a part of a vessel, the injection lance comprises a nozzle at its end through which the cleaning liquid is sprayed. The pressure of the cleaning liquid when leaving the nozzle preferably is at least 5 bar, more preferred at least 100 bar and particularly at least 500 bar. If the material of the vessel and the holding device is stainless steel, even a pressure of at least 1000 bar is preferred. By such a pressure impurities adhering on the walls can be mechanically removed. The maximum pressure which can be used for cleaning depends on the material of the vessel and the holding device and the impurities to be removed. The maximum pressure is selected such that the vessel and the holding device are not damaged by the cleaning liquid.

If the closing element is designed in such a way that the space for receiving the vessel in the holding device is completely closed when the closing element is closed, inserting the vessel for cleaning only is possible without closing the closing element. In this case the vessel with the cleaning device preferably is pressed against the stop by the piston or feeder arm which else is used for inserting or removing a vessel from the holding device.

For inspection of the interior of the holding device, for example to check the cleaning process, it is preferred to use an optical sensor. If no fouling on the optical sensor is expected, it is possible to mount the optical sensor on the holding device in such a way that the interior of the vessel can be observed during the process which is carried out in the vessel. If only the cleaning of the holding device shall be checked or if there are impurities in the holding device before inserting the vessel, it is preferred to use a vessel which comprises an optical sensor. The optical sensor for example can be a camera. For checking, the vessel with the optical sensor is inserted into the holding device, wherein it is possible to hold the vessel by the piston or feeder arm which in normal operation is used for removing and inserting vessels into the holding device. This allows to connect the vessel by using cables with an evaluation unit, for example a computer. Alternatively, it is also possible to provide electrical power supply, for example batteries, and, if applicable, a data storage unit in the vessel to operate the optical sensor in the vessel wireless. This allows to close the closing element after inserting the vessel into the holding device for the optical inspection.

Further, to remove components from a vessel, for example in a continuous process, it is possible to provide a dip tube which extends into the vessel from the top. By using a dip tube, no drainage needs to be guided through the closing element which holds the vessel in place during the process. If a dip tube is used, the dip tube can be part of the vessel and fixed to the vessel. To withdraw components by the dip tube, the dip tube preferably is connected with a drainage tube in the holding device when the vessel is inserted into the holding device. For the connection of the dip tube with the drainage tube any connecting element known to a skilled person can be used. Such connecting elements for example are snap-fit connections or suitable screw couplings. Alternatively, the dip tube can be part of the holding device and be inserted into the vessel when the vessel is inserted into the holding device. A tight closure of the vessel can be achieved, when the dip tube is passed through the cover in a tight manner, for example by sealing the passageway of the dip tube or by welding, soldering or gluing the dip tube into the cover of the vessel.

If such a dip tube for removing components is used, it is preferred to add components to the process as described above by feeding lines which are part of the holding device and preferably are connected to the cover of the holding device.

Alternatively, a dip tube could also be used as a cover sleeve around at least one sensor, for example a thermocouple. In this case the dip tube acts as a fouling protection and surrounds a tubular sensor as a protection against the process fluids in the vessel. During the insertion of the vessel into the holding device, the dip tube will be aligned with the sensor in a concentric way with the length of the dip tube enabling a protection of the sensor minimum above fluid level in the vessel.

The inventive system can be used for any reaction system which is carried out in a stirred tank reactor. Such reaction systems for example are heterogeneously or homogeneously catalyzed reactions wherein in a heterogeneously catalyzed reaction the catalyst is mixed in the reaction mixture. If a solid catalyst is used, the catalyst particularly is in the form of a powder or in the form of pellets.

Particularly preferably, the system can be used for carrying out reactions which tend to form deposits or fouling or where the components used in the reaction may form polymers which also may stick on the walls of the vessel. Such reactions for example are biocatalysis, enzyme catalysis, or the production of biopolymers. Biopolymers are polymers which either are produced by renewable primary products and/or which are bio-degradable. Further, reactions for which the system can be used are reactions for developing biofuels for replacing fossil resources.

Particularly, due to the increasing diversification if products shall be obtained by natural algae or bacteria growth, the processability of the raw material and the end products is difficult to assess and needs a number of experiments to process conditions which allow an upscaling to industrial scale. Increased use of biobased materials have the result that fouling and forming of deposits as well as spontaneous polymerization of the used biobased material determines the process by reducing the available production time due to excessive cleaning efforts. By the inventive process these process determining effects can be examined without negative effects on the available testing time itself.

Illustrative embodiments of the invention are shown in the figures and explained in more detail in the following description.

Figure 1:
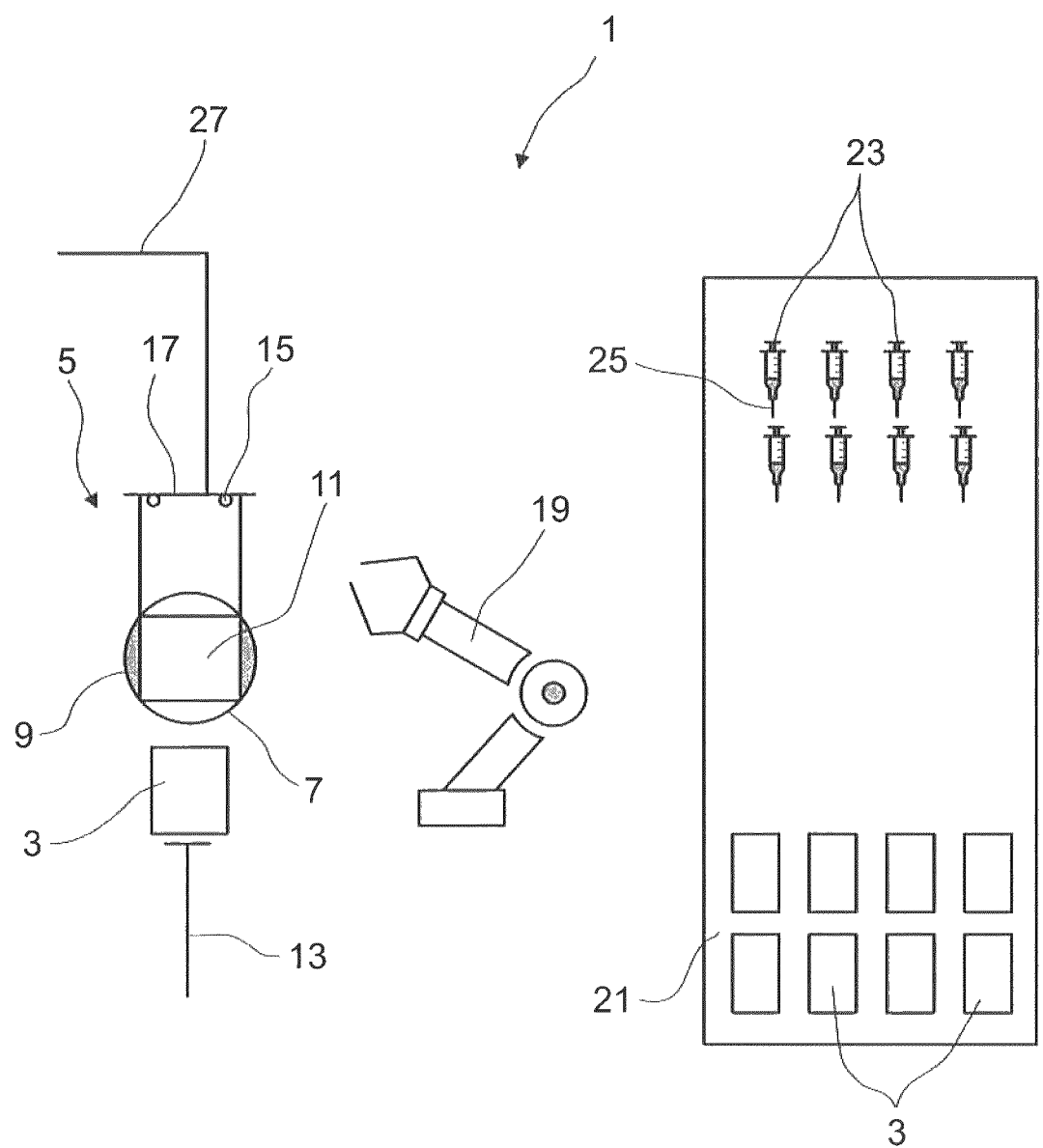
FIG. 1 shows a schematic view of an inventive system.

A system 1 for processing liquid and/or solid compounds comprises a vessel 3 and a holding device 5 for the vessel 3.

To insert the vessel 3 into the holding device 5, the holding device 5 comprises a supply unit 7 with a closing element 9. In the embodiment shown here, the closing element 9 is in the form of a ball with an opening 11. For inserting the vessel 3 into the holding device 5, the closing element 9 is in a first position, in which the opening 11 is arranged such that the vessel 3 can be pushed through the opening 11 into the holding device 5. To insert the vessel 3 through the opening 11 into the holding device 5, for example a piston 13 can be used. In this case, the vessel 3 is placed on top of the piston 13 and for inserting the vessel 3 into the holding device 5, the piston 13 moves upwards and thus the vessel 3 also moves upwards through the opening 11 into the holding device 5. This process is shown in more detail in FIGS. 2a to 2c.

On the side opposite the closing element 9, a stop 15 is provided. When inserting a vessel 3 into the holding device 5, the vessel 3 is pushed upwards until it rests against the stop 15. To obtain a fluid tight connection, it is possible to either provide the stop with a suitable sealing or to use a sealing as stop 15. For closing the vessel 3, in this case, it is particularly preferred, when the holding device 5 comprises a cover 17 by which the vessel is closed when inserted into the holding device 5.

For automatically change the vessels 3 after a process is finished, preferably a feeder 19 is provided. The feeder 19 for example can be a robot arm which can grab a vessel 3 from a supply 21 and put the vessel 3 on the piston 13. If a used vessel 3 from a previous process still stands on the piston 13, the feeder 19 first removes the used vessel 3 from the piston and puts the new vessel 3 onto the piston 13 in a following step. The used vessels 3 for example can be returned into the supply 21 or removed from the system 1. If the vessels 3 are removed from the system, it is for example possible to transport them to an analysis unit which is not shown here. Such an analysis unit for example can comprise a unit for analyzing the composition of the content in the vessel 3 like a chromatograph or a spectroscope, for example an X-ray spectroscope or an infrared spectroscope. Further, the analysis unit may comprise devices for measuring any physical or chemical properties of the contents in the vessel like viscosity, melting point, boiling point, or flash point, density, phase separation, color or turbidity.

For analyzing the contents of the vessel 3 during the process, it is further preferred to take samples from the vessel when it is placed in the holding device 5. Such samples for example can be taken by using syringe 23. Particularly preferably, the feeder 19 is designed in such a way, that the sample can be taken by using the feeder 19. In this case, the feeder 19 grabs a syringe 23 and takes the sample by using the syringe 23. This preferably is performed by introducing the syringe 23 into the vessel 3 while the vessel 3 is in the holding device 5. If the holding device 5 comprises the cover 17 for closing the vessel 3 or the vessel 3 itself is closed by a cover, it is particularly preferred, when the cover 17 is designed in such a way that an injection needle 25 of the syringe 23 can be penetrated through the cover. For this purpose it is for example possible to provide a membrane in the cover 17 which is made from an elastic material through which the injection needle 25 can be penetrated into the vessel 3. By using the elastic material, for example an elastomer, the hole which results from penetrating the injection needle 25 closes after the injection needle 25 is removed.

Besides taking samples by using the syringes 23, it is also possible to feed additional components into the vessel 3 by using a syringe 23. The principle for feeding components into the vessel 3 by using a syringe 23 is the same as for taking a sample by using a syringe 23. The only difference is that for taking a sample the syringe is empty when the injection needle 25 of the syringe 23 is penetrated through the membrane of the cover and the syringe is filled by pulling the piston of the syringe 23 after the injection needle 25 is penetrated through the membrane and that for feeding a component into the vessel 3, the syringe 23 contains that component when the injection needle is penetrated through the membrane and the contents of the syringe are fed into the vessel 3 by pushing the piston of the syringe 23 after the injection needle has penetrated the membrane and extends into the vessel 3. For taking a sample, it is necessary that the injection needle 25 has a length which is sufficient that the injection needle 25 extends into the contents of the vessel after having penetrated the membrane, whereas for feeding an additional component it depends on whether the component has to be fed with a dipped injection needle or can be added on top of the contents in the vessel 3.

The contents used for the process which is carried out in the vessel 3, can be fed into the vessel before the vessel is placed on the piston 13 for introducing the vessel 3 into the holding device 5. Further, all components can be added as described above by using syringes for feeding the components. Besides these options, it is also possible to feed the components for the process operated in the vessel 3 by using at least one feed line 27. The feed line preferably is arranged such that the components fed through the feed line are fed into the vessel 3 from above. If the holding device 5 comprises a cover 17, it is preferred to arrange the feed line 27 on the cover. In case the vessel comprises its own cover, it is possible to provide a connection means on the cover and to connect the feed line by using the connection means, when the vessel is placed in the holding device 5. Such a connection means for example can be a snap joint or a screw joint. Further, for taking samples continuously, it is also possible to use a sample line which is connected to the holding device 5 and extends into the vessel 3 when the vessel is inserted into the holding device 5.

For taking samples the sample line preferably is connected to a pump by which the sample can be withdrawn from the vessel 3. If the process in the vessel is carried out under pressure, it can be sufficient to set ambient pressure on the sample line for withdrawing a sample.

If the process in the vessel 3 is carried out under pressure or at a pressure below ambient pressure, a suitable compressor or vacuum pump is connected to the holding device 5 by which the respective pressure can be set to the vessel after the vessel is introduced into the holding device 5. In this case, it is necessary to tightly close the vessel 3, for example by the cover 17 of the holding device 5 or a separate cover which is part of the vessel to apply either excess pressure or a vacuum to the vessel 3 depending of the process which is carried out in the vessel 3. Besides only setting the respective pressure to the vessel 3, it is also possible, to set the excess pressure or the vacuum to the holding device 5. In this case, the holding device 5 has to be tightly closed. However, setting the pressure to the complete holding device 5 has the advantage, that the compressor or vacuum pump can be connected at any position of the holding device 5 and must not be connected to the cover 17 by which the vessel is closed. To keep the pressure during the whole process, in this case it is necessary to tightly close the holding device 5 after the vessel 3 is inserted. This is obtained by using a suitable closing element 9 which tightly closes the holding device 5, for example by using a ball as closing element 9 as shown in the figures.

To monitor the pressure and/or the temperature of the process carried out in the vessel 3, it is further possible, to apply suitable pressure sensors and/or temperature sensors. As usually no pressure differences occur in the vessel, for monitoring the pressure, one pressure sensor which can be placed at any position in the holding device 5 is sufficient. On the other hand, particularly if the process carried out in the vessel 3 is a chemical reaction or a thermal separation process, the temperature may be different on different positions in the vessel. Therefore, for monitoring temperature profiles, a plurality of temperature sensors placed at different positions should be provided. Temperature sensors and pressure sensors used for monitoring temperature and pressure, thereby, can be any temperature sensors or pressure sensors known to a skilled person.

Further, the pressure sensors and/or temperature sensors also can be used to control pressure and/or temperature in connection with a compressor or vacuum pump or a tempering device in a common manner known to a person skilled in the art.

Figure 2A:
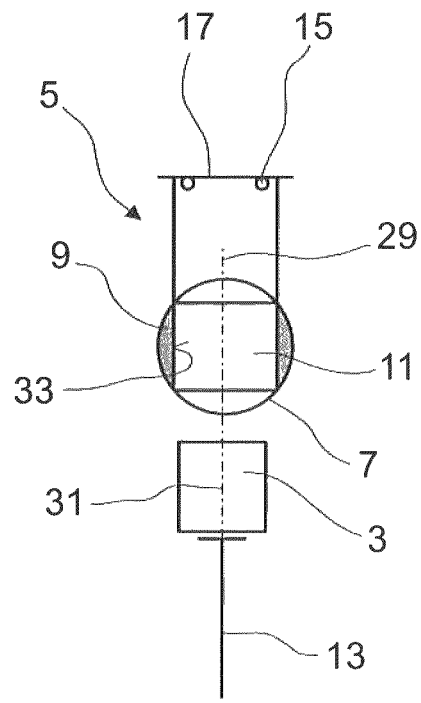
FIGS. 2a to 2c show the process of inserting a vessel into the holding device.
Figure 2B:
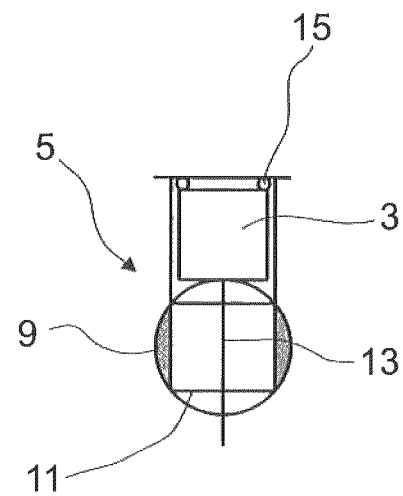
Figure 2C:
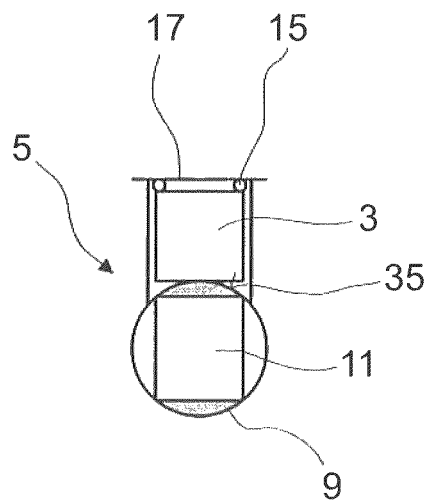

FIGS. 2a to 2c show the process of introducing a vessel 3 into the holding device 5 in a schematic way.

For inserting a vessel 3 into the holding device 5, in a first step as shown in FIG. 2a, the vessel 3 is placed on a piston 13 by which the vessel 3 can be lifted into the holding device 5. The closing element 9 of the supply unit 7 is in a first position in which the opening 11 is oriented such that that the central axis 29 of the opening 11 and the central axis 31 of the vessel 3 correspond. To further allow the vessel 3 to be pushed through the opening 11, the cross-sectional area of the opening 11 is designed such that the vessel 3 does not come into contact with the opening 11 when pushed through. Particularly preferably, cross-sectional area of the opening 11 corresponds to the cross-sectional area of the vessel 3 with the only difference that the cross-sectional area of the opening 11 is slightly bigger than the cross-sectional area of the vessel 3. Preferably, the cross-sectional area of the opening is designed such that there is a distance between the vessel 3 and the walls 33 in the range from 0.001 to 10 mm, preferably from 0.1 to 10 mm and particularly from 0.1 to 1 mm while the vessel 3 is in the opening 11. Thereby, it is not necessary that the distance between the walls 33 of the opening and the vessel 3 is constant over the full circumference of the vessel 3. It only has to be considered that there is a distance between the walls of the opening 11 and the vessel 3 over the whole circumference of the vessel 3.

After placing the vessel 3 on the piston 13, the piston moves upwards to push the vessel 3 through the opening 11 in the closing element 9 into the holding device 5. The movement of the piston is stopped as soon as the vessel 3 abuts the stop 15 in the holding device 5. This is shown in FIG. 2b. After the vessel 3 has reached this position, the vessel 3 is arrested in this position to allow removing the piston 13 and to keep the vessel 3 in its position. This for example can be done by slightly twisting the closing element 9 so that an edge of the bottom of the vessel 3 stands on the closing vessel at the edge of the opening 11. By this slight twisting the opening 11 remains in a position which allows moving the piston downward to bring the piston 13 into a position in which the closing element 9 can be brought into a second position in which the vessel 3 is fixed in the holding device 5. This second position of the closing element 9 is shown in FIG. 2c. When the closing element 9 is in this position, the vessel 3 rests on an outer surface 35 of the closing element 9 and is pressed against the stop 15.

If the space in the holding device 5 in which the vessel 3 is accommodated for carrying out the intended process has to be tightly closed, it is preferred that the supply unit 7 with the closing element 9 is designed in such a way that the bottom of the holding device 5 is tightly closed when the closing element 9 is in the second position as shown in FIG. 2c. Further the cover 17 is provided which tightly closes the top of the holding device 5. Further, by designing the stop 15 as a sealing or by providing the stop 15 with a sealing, for example an O-ring or a sealing cord, it is possible to tightly close the vessel 3.

For removing the vessel 3 from the holding device 5 after the process carried out in the vessel is finished, the closing element is twisted back into the position in which the piston 13 can be moved through the opening 11 but the vessel 3 still is hold in place, then the piston 13 is moved upwards until the vessel 3 stands on the piston 13. In a next step, the closing element 11 is twisted into the first position which allows to remove the vessel 3 by moving downwards the piston 13 on which the vessel 3 stands. After being moved downwards the vessel 3 can be replaced by another vessel to carry out the next process.

Figure 3:
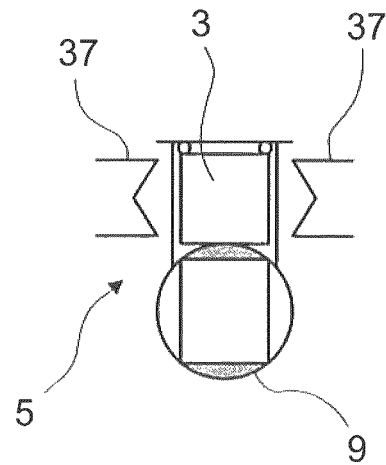
FIG. 3 shows a heatable holding device with an inserted vessel.

If it is necessary to cool or heat the vessel 3 during the process carried out in the vessel 3, a temperature regulating element 37 can be provided as shown in FIG. 3.

If the vessel 3 shall be heated, it is for example possible to design the holding device 5 with a double jacket or to enclose the holding device 5 with heating coils through which a heating medium, for example hot water, steam or a thermal oil can flow. For cooling the vessel 3, it alternatively is possible to use a cooling medium like cold water, or any other liquid medium which is known to a skilled person, which flows through the double jacket or the heating coils.

Further, it is also possible to use an electrical heating or induction heating for heating the vessel or Peltier elements for cooling. Beside these, all other heating or cooling devices known to a skilled person and suitable for heating or cooling the vessel 3 can be used as temperature regulating element 37.

To carry out different processes in the vessel, it is possible to use different vessels 3 for the different processes. Examples for vessels which can be used in the inventive system are shown in FIGS. 4a to 4c.

Figure 4A:
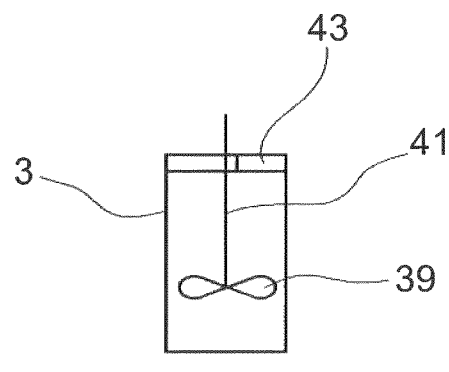
FIGS. 4a to 4f show different vessels which can be inserted into the holding device.
Figure 4B:
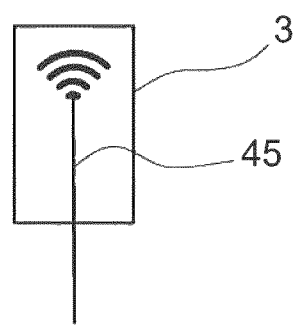
Figure 4C:
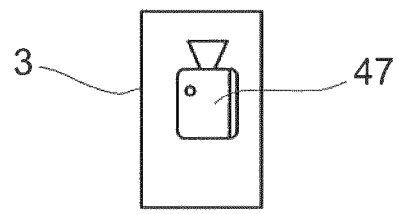

If mixing of the contents of the vessel 3 is necessary, it is for example possible to use a vessel which is equipped with a mixing device 39 as shown in FIG. 4a. The mixing device 39 can be any stirrer which allows mixing of the contents in the vessel 3, for example a paddle mixer, an oblique paddle mixer, a propeller mixer, a horseshoe mixer or any other mixer or agitator known to a skilled person.

For operating the mixing device 39, preferably a shaft 41 of the mixing device 39 is guided through a holding device 43. Depending on the geometry, the shaft can be held in the center of the holding device 43 or eccentric. Further, it is possible to orient the shaft 41 parallel to the central axis of the vessel 3 or inclined to the central axis of the vessel 3. The holding device 43 preferably comprises a bearing, for example a ball bearing, in which the shaft is fixed. If the vessel shall be closed, it is further possible to design the holding device 43 as cover. Alternatively, the holding device 43 also can comprise at least one, preferably 2, 3 or 4 bars which hold the bearing in which the shaft 41 is fixed and which may have any suitable cross-section, for example circular or angular like triangular or quadrangular.

The shaft 41 of the mixing device 39 preferably is designed such that it can be attached to a driving shaft when the vessel 3 is inserted into the holding device 5. The driving shaft can be part of the holding device 5 or a separate part which ends at such a position that the shaft 41 attaches to the driving shaft after the vessel 3 is inserted into the holding device 5. As an alternative to a driving shaft it is also possible to place the motor for the mixing device 39 in a position that the shaft 41 is directly connected to the motor when the vessel 3 is inserted into the holding device 5.

For cleaning the inside of the holding device 5, it is possible to use a vessel 3 which is equipped with a cleaning device 45. The cleaning device for example can be an injection lance by which a cleaning liquid is sprayed into the holding device 5 after the vessel 3 is inserted into the holding device 5. For feeding the cleaning liquid, the injection lance can be connected to a flexible feed line, for example a flexible tube or a hose. Depending on the position of the flexible feed line in the vessel 3, it is possible to have a fixed connection which needs not to be disconnected when placing the vessel 3 on the piston 13 or removing the vessel 3 back to a supply where it is stored when not used. If the feed line for the cleaning device 45 has to be guided through the opening 11 in the closing element 9 it might not be possible to bring the closing element 9 into the second position after inserting the vessel 3. In this case it is either possible to hold the vessel 3 in the holding device 5 by twisting the closing element 9 only partly so that an access to the vessel through the opening 11 remains open. Alternatively, it is also possible, that for the cleaning process the vessel remains on the piston 13 and the closing device 9 remains in the first position which allows the vessel 3 and the piston 13 being pushed through the opening 11.

FIG. 4c shows schematically a vessel 3 with an optical device 47, for example a camera or an optical sensor. Such a vessel 3 can be used for example to observe the process in the vessel or alternatively to monitor for example the cleaning result of the holding device 5 after the vessel 3 with the cleaning device 45 was used. The picture of the cleaning result taken with the optical device 47 can be compared with a picture of the holding device 5 in a clean state to assess the cleaning success and to repeat the cleaning if necessary.

Figure 4D:
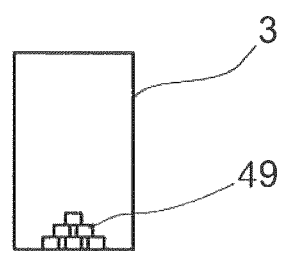

If a process shall be carried out which uses components which are difficult to feed or which are solid, it is further possible to add these components 49 into the vessel 3 before the vessel 3 is inserted into the holding device 5. Such a vessel 3 with predosed components 49 is shown exemplary in FIG. 4d.

Figure 4E:
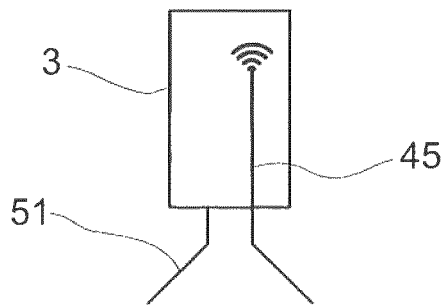

A further embodiment for a vessel 3 which can be used for cleaning is shown in FIG. 4e. In difference to the vessel 3 with the cleaning device 45 shown in FIG. 4b, the vessel 3 of FIG. 4e additionally comprises a drainage 51 for used cleaning liquid. This additional drainage 51 allows using an amount of cleaning liquid which exceeds the volume of the vessel 3 as during the cleaning process the cleaning liquid can be drained. Besides draining the cleaning liquid during the cleaning process, the cleaning is carried out as described above in connection with FIG. 4b.

Figure 4F:
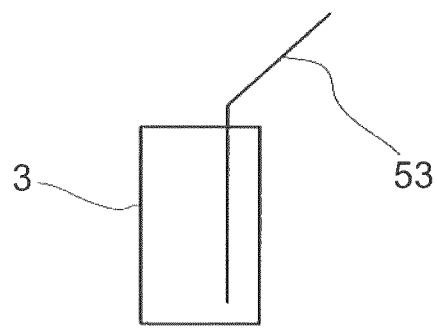

If it is intended to carry out a continuous process in the vessel 3, it is necessary to remove components from the vessel 3 during the process to keep the amount in the vessel 3 constant. For removing components, it is preferred to use a dip tube 53 as shown in FIG. 4f. By using the dip tube 53, removing components can be carried out from the top of the vessel which allows a tight closing of the holding device 5 by the closing element 9 as no drainage has to be guided through the closing element 9. If a dip tube is used, it can be part of the vessel 3 and fixed to the vessel 3, wherein a connection is provided with a drainage tube in the holding device 5 to which the dip tube 53 is connected when the vessel 3 is inserted into the holding device 5. Alternatively, the dip tube 53 can be part of the holding device 5 and be inserted into the vessel 3 when the vessel is inserted into the holding device 5.

If such a dip tube 53 for removing components is used, it is preferred to add components to the process as described above by feeding lines which are part of the holding device 5 and preferably are connected to the cover 17 of the holding device 5.

Alternatively, a dip tube 53 could also be used as a cover sleeve around at least one sensor, for example a thermocouple. In this case the dip tube 53 acts as a fouling protection and surrounds a tubular sensor as a protection against the process fluids in the vessel. During the insertion of the vessel 3, the dip tube 53 will be aligned with the sensor in a concentric way with the length of the dip tube 53 enabling a protection of the sensor minimum above fluid level in the vessel.

LIST OF REFERENCE NUMERALS 1 system
3 vessel
5 holding device
7 supply unit
9 closing element
11 opening
13 piston
15 stop
17 cover
19 feeder
21 supply
23 syringe 25 injection needle
27 feed line
29 central axis of the opening 11
31 central axis of the vessel 3
33 wall
35 outer surface
37 temperature regulating element
39 mixing device
41 shaft
43 holding device
45 cleaning device
47 optical device
49 components
51 drainage
53 dip tube

The invention claimed is:

1. A system for processing liquid and/or solid compounds, comprising a vessel and a holding device for the vessel, the holding device comprising a stop against which the vessel rests after being inserted into the holding device and a supply unit opposite the stop, the supply unit comprising a closing element, which can be set to a first and a second position, wherein in the first position of the closing element the vessel can be inserted into the holding device and in the second position of the closing element the vessel inserted into the holding device is pressed against the stop by the closing element, wherein the closing element comprises a ball which is mounted rotatable in a housing, the ball comprising an opening through which the vessel can be inserted into the holding device in the first position and wherein the vessel rests on an outer surface of the ball in the second position.

2. The system according to claim 1, wherein the stop comprises a sealing element against which the vessel rests when being inserted into the holding device.

3. The system according to claim 1, wherein the holding device comprises a temperature regulating element for tempering the vessel.

4. The system according to claim 1, wherein the holding device encloses the vessel tightly when the closing element is in the second position.

5. The system according to claim 1, wherein the holding device comprises at least one inlet to feed material into the vessel.

6. The system according to claim 1, wherein the holding device comprises at least one entry through which a sample can be taken.

7. The system according to claim 1, wherein the stop in the holding device is part of a cover by which the vessel is closed, when inserted into the holding device.

8. The system according to claim 1, further comprising a mixing device.

9. The system according to claim 8, wherein the mixing device is mounted in the vessel and the holding device comprises a seating for the mixing device which is arranged such that the mixing device is inserted into the seating when the vessel rests against the stop.

10. The system according to claim 8, wherein the mixing device is arranged on the holding device in such a way that the mixing device enters into the vessel when the vessel is inserted into the holding device.

11. The system according to claim 1, additionally comprising a feeder by which a number of vessels can be inserted into the holding device in succession.

12. The system according to claim 11, wherein at least one vessel comprises an optical sensor.

13. The system according to claim 11, wherein at least one vessel comprises a cleaning device for cleaning the holding device.

14. The system according to claim 13, wherein the cleaning device comprises an injection lance to spray a cleaning liquid into the holding device.

* * * * *